US009801102B2

(12) United States Patent
Xu et al.

(10) Patent No.: US 9,801,102 B2
(45) Date of Patent: Oct. 24, 2017

(54) METHOD AND APPARATUS FOR HANDOVER USING X2 INTERFACE BASED ON CLOSED SUBSCRIBER GROUP IN MOBILE COMMUNICATION SYSTEM

(75) Inventors: Lixiang Xu, Beijing (CN); Hong Wang, Beijing (CN); Huarui Liang, Beijing (CN)

(73) Assignees: Samsung Electronics Co., Ltd., Suwon-si (KR); Beijing Samsung Telecom R & D Center, Beijing (CN)

( * ) Notice: Subject to any disclaimer, the term of this patent is extended or adjusted under 35 U.S.C. 154(b) by 0 days.

(21) Appl. No.: 13/093,191

(22) Filed: Apr. 25, 2011

(65) Prior Publication Data

US 2011/0269465 A1 Nov. 3, 2011

(30) Foreign Application Priority Data

Apr. 28, 2010 (CN) .......................... 2010 1 0159953
Apr. 29, 2010 (CN) .......................... 2010 1 0168721

(51) Int. Cl.
  *H04W 36/00* (2009.01)
  *H04W 84/04* (2009.01)
  *H04W 92/20* (2009.01)

(52) U.S. Cl.
  CPC ...... *H04W 36/0033* (2013.01); *H04W 84/045* (2013.01); *H04W 92/20* (2013.01)

(58) Field of Classification Search
  CPC ........... H04W 84/045; H04W 36/0055; H04W 36/0083; H04W 36/0005; H04W 36/30;
  (Continued)

(56) References Cited

U.S. PATENT DOCUMENTS 7,443,835 B2 10/2008 Lakshmi Narayanan et al.
2005/0090259 A1 4/2005 Jain et al.
(Continued)

FOREIGN PATENT DOCUMENTS

CN 1820210 A 8/2006
CN 101547406 A 9/2009
(Continued)

OTHER PUBLICATIONS

3GPP TS 36.423 V9.2.0 (Published: Mar. 2010) 3rd Generation Partnership Project; Technical Specification Group Radio Access Network; Evolved Universal Terrestrial Radio Access Network (E-UTRAN); X2 application protocol (X2AP) (Release 9).*
(Continued)

*Primary Examiner* — Nalini Mummalaneni
(74) *Attorney, Agent, or Firm* — Jefferson IP Law, LLP

(57) ABSTRACT

A method for handover of User Entity (UE) by a source Base Station (BS) is provided. The method includes determining whether to handover the UE using an X2 interface, transmitting a handover request message to a target BS, the handover request message including Closed Subscriber Group (CSG) information of the target BS, and receiving a handover request acknowledgement message from the target BS, wherein the determining of whether to handover the UE using the X2 interface includes, if there is the X2 interface between the source BS and the target BS, and if the target BS does not support a CSG or the target BS supports a same CSG supported by the source BS, determining to perform the handover of the UE using the X2 interface, and obtaining the CSG information of the target BS through an X2 interface set up procedure.

18 Claims, 10 Drawing Sheets

(58) Field of Classification Search
CPC . H04W 36/0038; H04W 36/04; H04W 48/08;
H04W 48/02; H04W 92/045; H04W
92/20; H04W 12/08; H04W 8/186; H04W
8/20; H04W 88/08
USPC .................. 455/436–444; 370/331, 355, 356
See application file for complete search history.

(56) References Cited

U.S. PATENT DOCUMENTS

| | | |
|---|---|---|
| 2006/0267840 A1 | 11/2006 | Stenberg et al. |
| 2008/0049677 A1 | 2/2008 | Hayashi |
| 2009/0047960 A1 | 2/2009 | Gunnarsson et al. |
| 2010/0008293 A1 | 1/2010 | Gupta et al. |
| 2010/0075667 A1 | 3/2010 | Nakamata et al. |
| 2010/0157943 A1* | 6/2010 | Horn .............................. 370/331 |
| 2010/0227627 A1 | 9/2010 | Ishii et al. |
| 2011/0116478 A1 | 5/2011 | Zhang et al. |
| 2012/0021743 A1* | 1/2012 | Filipovic et al. .......... 455/435.1 |
| 2012/0069737 A1 | 3/2012 | Vikberg et al. |
| 2012/0100852 A1* | 4/2012 | Horn .............................. 455/436 |
| 2012/0252459 A1* | 10/2012 | Yu et al. ....................... 455/436 |
| 2012/0258768 A1 | 10/2012 | Takahashi et al. |
| 2012/0263147 A1 | 10/2012 | Takahashi et al. |

FOREIGN PATENT DOCUMENTS

| | | |
|---|---|---|
| EP | 2 139 257 A1 | 12/2009 |
| EP | 2 148 537 A1 | 1/2010 |
| EP | 2 490 481 A1 | 8/2012 |
| EP | 2 509 362 A1 | 10/2012 |
| JP | 2009-77368 A | 4/2009 |
| JP | 2009-207108 A | 9/2009 |
| JP | 2011-87089 A | 4/2011 |
| JP | 2011-120108 A | 6/2011 |
| RU | 2006117780 A | 11/2007 |
| RU | 2 353 073 C2 | 4/2009 |
| WO | 2010/009672 A1 | 1/2010 |
| WO | WO 2010047647 A1 * | 4/2010 |
| WO | WO 2010126155 A1 * | 11/2010 |

OTHER PUBLICATIONS

3GPP TS 23.401 V9.4.0 (Published: Mar. 2010) 3rd Generation Partnership Project; Technical Specification Group Services and System Aspects; General Packet Radio Service (GPRS) enhancements for Evolved Universal Terrestrial Radio Access Network (E-UTRAN).*
Agenda Item 12.4 by Huawei at 3GPP TSG-RAN WG3#63bis (Discussion of HeNB to HeNB Handover; Published Mar. 18, 2009; R3-090805.*
Agenda Item 10.2.0 by Samsung at 3GPP TSG-RAN WG3 Meeting#61 (Published Aug. 13, 2008; R3-082045).*
3GPP TS 36.413 V9.2.1 (Published Apr. 15, 2010) 3rd Generation Partnership Project; Technical Specification Group Radio Access Network; Evolved Universal Terrestrial Radio Access Network (E-UTRAN); S1 Application Protocol (S1AP) (Release 9).*
3GPP TS 36.304, version 8.4.0, Release 8 (3GPP Technical Specification Group Radio Access Network; Evolved Universal Terrestrial Radio Access (E-UTRA); User Equipment (UE) procedures in idle mode) Published Dec. 2008.*
3GPP TS 22.220 V10.2.0 (Published: Mar. 2010) 3rd Generation Partnership Project; Technical Specification Group Services and System Aspects; Service requirements for Home Node B (HNB) and Home eNode B (HeNB) (Release 10).*
R3-091825: Support of inter-Home eNB Mobility, 3GPP TSG-RAN WG3 #65Agenda Item 12.1.3; Aug. 31, 2009; Proposal by Alcatel-Lucent.*
3GPP TS 36.300 ¥9.2.0 (Published: Dec. 2009}; 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description;Stage 2 (Release 9).*
Widjaja et al., Sizing X2 Bandwidth for Iner-Connected eNBs, IEEE 70th VTC 2009—Fall.
Motorola, NTT DOCOMO, Qualcomm Incorporated, Nokia Siemens Networks, Interdigital, CR capturing HeNB inbound mobility agreements, CR capturing HeNB inbound mobility agreements, 3GPP TSG-RAN WG2 Meeting #68bis, R2-100450, Valencia, Spain, Jan. 18-22, 2010.
Qualcomm Incorporated, CR capturing HNB inbound mobility agreements, 3GPP TSG-RAN WG2 Meeting #68bis, R2-100483, Valencia, Spain, Jan. 18-22, 2010.
3GPP TS 36.300 V8.12.0, 3rd Generation Partnership Project; Technical Specification Group Radio Access Network; Evolved Universal Terrestrial Radio Access (E-UTRA) and Evolved Universal Terrestrial Radio Access network (E-UTRAN); Overall description; Stage2 (Release 8), Apr. 21, 2010.
Huawei, 3GPP TSG-RAN WG3#63bis, Discussion of Inbound Handover, R3-090932, Mar. 23-26, 2009, Seoul, Korea.
3GPP TSG-RAN WG3#65, R3-091991, Ericsson, Termination of HO signalling in case of HeNB connected via HeNB Gw[online], Internet <URL:http://www.3gpp.org/ftp/tsg_ran/WG3_lu/TSGR3_65/Docs/R3-091991.zip>, Shenzhen, China, Aug. 24-28, 2009.
3GPP TSG-RAN WG3#65, R3-091825, Support of inter-Home eNB Mobility[online], Internet <URL:http://www.3gpp.org/ftp/tsg_ran/WG3_lu/TSGR3_65/Docs/R3-091825.zip>, Shenzhen, China, Aug. 24-28, 2009.
3GPP TSG-RAN WG3#65, R3-091799, The interference control between HeNBs[online], Internet <URL:http://www.3gpp.org/ftp/tsg_ran/WG3_lu/TSGR3_65/Docs/R3-091799.zip>, Shenzhen, China, Aug. 24-28, 2009.
Samsung, 3GPP TSG-RAN WG3 Meeting #61 (R3-082045), E-UTRAN identities, Aug. 18-22, 2008, Jeju Island, Korea.
3GPP TS 36.304 V9.1.0, 3rd Generation Partnership Project; Technical Specification Group Radio Access Network; Evolved Universal Terrestrial Radio Access (E-UTRA); User Equipment (UE) procedures in idle mode (Release 9), Dec. 2009.
Alcatel-Lucent, Handling of CSG for in-bound Mobility, 3GPP TSG-RANWG3#63bis, R3-090745, Mar. 26, 2009, p. 2, 3, URL:http://www.3gpp.org/ftp/tsg_ran/WG3_lu/TSGR3_63bis/Docs/R3-090745.zip.
Alcatel-Lucent, Vodafone, Congested H(e)NB Hybrid Access Mode cell, 3GPP TSG-RAN WG3#64, R3-091053, May 8, 2009, p. 1, URL:http://www.3gpp.org/ftp/tsg_ran/WG3_lu/TSGR3_64/Docs/R3-091053.zip.
Motorola, Introduction of PLMN-related abnormal conditions during HO in Network sharing scenarios, 3GPP TSG-RAN WG3#66bis, R3-100107, Jan. 22, 2010, p. 2, URL:http://www.3gpp.org/ftp/tsg_ran/WG3_lu/TSGR3_66bis/Docs/R3-100107.zip.
Qualcomm Europe, Access control for in-bound handover to a CSG cell,3GPP TSG-RAN WG3#65, R3-091532, Aug. 28, 2009, p. 1, 2, URL:http://www.3gpp.org/ftp/tsg_ran/WG3_lu/TSGR3_65/Docs/R3-091532.zip.
Ericsson, CSG id in Initial UE message, 3GPP Draft, R3-083322, 3rd Generation Partnership Project (3GPP), Nov. 5, 2008, XP050324540, Prague, Czech Republic.
Alcatel-Lucent, Access control in the HNB network for Inbound mobility, 3GPP Draft; R3-090865, 3rd Generation Partnership Project (3GPP), Mar. 18, 2009, XP050341236, Seoul, Korea.
Qualcomm Europe, Access control for in-bound mobility to HeNBs, 3GPP Draft, S2-090792, 3rd Generation Partnership Project (3GPP), Jan. 16, 2009, XP050333219, Scottsdale, Phoenix, USA.
Alcatel-Lucent, Support of inter-Home eNB Mobility, 3GPP Draft, R3-091825, Henbhandover, 3rd Generation Partnership Project (3GPP), Aug. 20, 2009, XP050353194, Shenzhen, China.
Huawei et al., Support for CSG based charging, 3GPP Draft, S2-094410 CSG Based Charging, 3rd Generation Partnership Project (3GPP), Jun. 29, 2009, XP050355932, Sophia Antipolis, France.

* cited by examiner

METHOD AND APPARATUS FOR HANDOVER USING X2 INTERFACE BASED ON CLOSED SUBSCRIBER GROUP IN MOBILE COMMUNICATION SYSTEM

PRIORITY

This application claims the benefit under 35 U.S.C. §119(a) of a Chinese patent application filed on Apr. 28, 2010 in the Chinese Intellectual Property Office and assigned Serial No. 201010159953.4 and a Chinese patent application filed on Apr. 29, 2010 in the Chinese Intellectual Property Office and assigned Serial No. 201010168721.5, the entire disclosures of all of which are hereby incorporated by reference.

BACKGROUND OF THE INVENTION

1. Field of the Invention

The present invention relates to a handover method and apparatus using an X2 interface in the mobile communication system.

2. Description of the Related Art

Long Term Evolution (LTE) is an evolution technology of the third Generation (3G) mobile communication system, and has several advantages, such as enhancing the capacity of cells and reducing the system delay.

FIG. 1 is a schematic diagram illustrating an architecture of a LTE system according to the related art.

Referring to FIG. 1, the Evolved Universal Terrestrial Radio Access Network (E-UTRAN) of the LTE system typically includes radio resource management entities, such as evolved Node Bs (eNBs) and Home eNBs (HeNBs), and may further include HeNB GateWays (GWs). When the HeNB GWs are not included, the HeNBs may directly connect with Mobile Management Entities (MMEs) of the core network. When the HeNB GWs are included, the HeNBs connect with the MMEs through the HeNB GW. The MMEs are important network entities of the core network, and are responsible for functions such as, radio access bearer establishment and mobility management.

In the mobile communication system, in order to provide better services for particular users, as for a particular group, a Closed Subscriber Group (CSG) is usually needed to be formed with multiple radio resource management entities. For example, all users of a company or campus form a particular user group. A CSG is formed for this user group with multiple radio resource management entities to provide specialized access services.

The radio resource management entities of the LTE include eNB 101 and HeNB 103. The radio resource management entities of the LTE may further include HeNB GW 103. Each eNB 101 is connected with each other through an X2 interface. Each eNB 101 is directly connected with MME 104 in a Core Network (CN) through an S1 interface. HeNB 102 may connect with HeNB GW 103 through the S1 interface, and then HeNB GW 103 may connect with MME 104 through the S1 interface. HeNB 102 may also directly connect with MME 104 through the S1 interface. When there is no HeNB GW 103 deployed in the system, HeNB 102 directly connects with MME 104 through S1 interface. Both eNB 101 and HeNB 102 may connect with multiple MMEs 104 in the CN.

In order to provide richer access services, the radio resource management entities of the LTE system shown in FIG. 1 usually include more types. For example, the HeNBs are classified into open HeNBs, hybrid HeNBs, and CSG HeNBs. The open HeNBs denote HeNBs which are not directed against any particular user group, and to which any User Entity (UE) may access. The CSG HeNBs denote HeNBs in the CSG user group, and only permit the access of UEs in the particular group served by the CSG HeNBs. The hybrid HeNBs denote the HeNBs which support the function of the CSG, permit the access of UEs in the particular user group served by the hybrid HeNBs, and also permit the access of the UEs in a general user group.

The UE may move among different HeNBs and between a HeNB and eNB. The movement of UE is implemented through S1 handover. The S1 handover represents handover using an S1 interface.

FIG. 2 is a schematic diagram illustrating an S1 handover procedure according to the related art. Suppose each of HeNBs connects with the MME through the HeNB GW.

Referring to FIG. 2, a source HeNB 217 sends a handover required message to a HeNB GW 219 in step 201a. How to send a measurement report to the source HeNB 217 from the UE 216 and how to initiate the handover by the source HeNB 217 is not introduced here.

In step 201b, the HeNB GW 219 sends the handover required message to the MME (220).

In step 202a, the MME 220 sends a handover request message to the HeNB GW 219, and in the step 202b, the HeNB GW 219 sends the handover request message to the target HeNB. The source HeNB 217 denotes the HeNB at which the UE 216 is originally located. The target HeNB 218 refers to the HeNB to which the UE performs handover.

In step 203, the target HeNB 218 allocates resources for the UE 216, and in step 203a, sends a handover request acknowledgement message to the HeNB GW 219. In step 203b, the HeNB GW 219 sends the handover request acknowledgement message to the MME 220.

In step 205a, the MME 220 sends a handover command message to the HeNB GW 219. In step 205b, The HeNB GW 219 sends the handover command message to the source HeNB 217.

In step 206, the source HeNB 217 sends a Radio Resource Control (RRC) connection re-configuration message to the UE 216.

In step 207, the UE 216 synchronizes to the target cell, and in step 208, sends the RRC connection re-configuration completion message to the target HeNB 218.

In step 209a, the target HeNB 218 sends a handover notify message to the HeNB GW 219. In step 209b, the HeNB GW 219 sends the handover notify message to the MME 220.

In step 210, the MME 220 sends a modify bearer request message to a Service-Gateway/Packet Data Network Gateway (S-GW/PDN GW) 225. The S-GW is mainly used for providing a user plane function. The PDN GW is mainly used for functions, e.g., charging and lawful interception. In step 211, the S-GW and PDN GW may be set in a same physical entity, or be two entities. This step omits the signaling interactions between the S-GW and PDN GW.

In step 212, the S-GW/PDN GW 221 sends a modify bearer response message to the MME 220.

In step 213, the UE 216 initiates a Tacking Area Update (TAU) process.

In step 213a, The MME 220 sends a UE context release command message to the HeNB GW 219. In step 213b, the HeNB GW 219 sends the UE context release command message to the source HeNB 217.

In step 214a, the source HeNB 217 sends the UE 216 context release completion message to the HeNB GW 219. In the 214b, the HeNB GW 219 sends the UE 216 context release completion message to the MME 220.

Although the above process may implement the handover procedure, taking the large number of HeNBs and the often handover of UE into consideration, if each handover is implemented through the S1 handover, the burden of the core network is heavily aggravated and the efficiency of the handover is reduced. Similarly, the above issues also exist when the UE moves between the HeNB and eNB, and between eNB and eNB.

In the related art as described above, movement of UE between HeNB and eNB is also achieved through S1 handover. From above analysis, it can be seen that movement of UE between HeNBs through S1 handover is achieved via the CN, which includes handover preparation and data forwarding. If each movement of UE between HeNBs is achieved through S1 handover, a very heavy load will be brought for the CN due to the huge number of HeNB. The handover efficiency may be reduced.

However, handover preparation and data forwarding in prior X2 handover process are not necessary to be performed through the MME. Thus, the X2 handover process may be applied for the movement of UE between HeNBs.

FIGS. 3A-3C are a connection schematic diagram illustrating applying X2 handover to an HeNB according to the related art. FIG. 3A is a connection schematic diagram illustrating movement (300) of a UE between HeNBs 305a and 305b through X2 handover. FIG. 3B is a connection schematic diagram illustrating movement (310) of a UE from HeNB 315 to eNB 320 through X2 handover. FIG. 3C is a connection schematic diagram illustrating movement (325) of UE from eNB 330 to HeNB 335 through X2 handover.

Referring to FIGS. 3A-3C, since the HeNB GW possesses Non-Access-Stratum (NAS) Node Selection Function (NNSF), the HeNB GW will select a serving MME for a UE under the HeNB when the HeNB accesses the MME through the HeNB GW. However, the HeNB doesn't learn of the MME selected by the HeNB GW for the UE. Accordingly, when executing the X2 handover, the source HeNB cannot inform the target HeNB about the serving MME of the UE. Subsequently, the target HeNB, or the eNB, or the target HeNB GW will not learn to which MME the path switch request message should be sent. The handover process will be unsuccessful if the message has been sent to other MME instead of the MME initially accessed by the UE.

SUMMARY OF THE INVENTION

Aspects of the present invention are to address the above-mentioned problems and/or disadvantages and to provide at least the advantages described below. Accordingly, an aspect of the present invention is to provide a handover method using an X2 interface in the mobile communication system.

Another aspect of the present invention is to provide that a Mobile Management Entity (MME) identifier of a MME accessed by a User Entity (UE) to perform X2 handover is provided to a target evolved Node B (eNB)/Home eNB (HeNB) or target HeNB GateWay (GW) during the X2 handover.

In accordance with an aspect of the present invention, a method for handover of a User Entity (UE) by a source Base Station (BS) is provided. The method includes determining whether to handover the UE using an X2 interface, transmitting a handover request message to the target BS, the handover request message including Closed Subscriber Group (CSG) information of a target BS, and receiving a handover request acknowledgement message from the target BS, wherein the determining of whether to handover the UE using the X2 interface includes, if there is X2 interface between the source BS and the target BS, and if the target BS doesn't support a CSG or the target BS supports the same CSG supported by the source BS, determining to perform the handover of the UE using the X2 interface, and obtaining the CSG information of the target BS through an X2 interface set up procedure.

In accordance with another aspect of the present invention, a method for handover of a User Entity (UE) by a target Base Station (BS) is provided. The method includes receiving a handover request message from a source BS, the handover request message including CSG information of a target BS, if the CSG information includes a first CSG IDentifier (ID), determining whether the first CSG ID and a second CSG ID are the same, and obtaining the second CSG ID from CSG information broadcasted from the target cell, if the first CSG ID and the second CSG ID are the same, transmitting a handover request acknowledgement message to the source BS, and receiving a Radio Resource Control (RRC) re-configuration message from the UE, transmitting a path switch request message including the second CSG ID to Mobility Management Entity (MME), and if a path switch request acknowledgement message is received from the MME, transmitting an UpLink (UL) context release message to the source a BS.

In accordance with another aspect of the present invention, a method for handover of a User Entity (UE) by a Mobility Management Entity (MME) is provided. The method includes receiving a path switch request message from a target BS, the path switch request message including CSG information of the target BS, if the CSG information indicates that the target BS is a CSG BS supporting a specific CSG, transmitting a bearer update request message including user CSG information to a user plane entity, and receiving a bearer update response message, and transmitting a path switch request acknowledgement message to the target BS, wherein the CSG information of the target BS or CSG information broadcast from the target cell includes an access mode indicating that the target BS is CSG BS supporting a specific CSG or hybrid BS supporting the specific CSG and UEs not included the specific CSG, if the target BS is the CSG BS or the hybrid BS, the CSG information includes a CSG ID of the specific CSG, and if the target BS supports the same CSG supported by the source BS, the CSG information includes an identifier indicating that the target BS supports the same CSG.

In accordance with another aspect of the present invention, a source Base Station (BS) for handover of User Entity (UE) is provided. The source BS includes a controller for determining whether to handover the UE using an X2 interface, a transmitter for transmitting a handover request message to a target BS, the handover request message including CSG information of the target BS, and a receiver for receiving a handover request acknowledgement message from the target BS, wherein if there is an X2 interface between the source BS and the target BS, and if the target BS doesn't support a CSG or the target BS supports a same CSG supported by the source BS, the controller determines to perform the handover of the UE using the X2 interface, and obtains the CSG information of the target BS through an X2 interface set up procedure.

In accordance with another aspect of the present invention, a target Base Station (BS) for handover of User Entity (UE) is provided. The target BS includes a receiver for receiving a handover request message comprising CSG information of a target BS from a source BS, a controller for determining, if the CSG information includes a first CSG ID, whether the first CSG ID and a second CSG ID are the same, and for obtaining the second CSG ID from CSG information broadcasted from the target cell, and if the first CSG ID and the second CSG ID are the same, the transmitter transmits a handover request acknowledgement message to the source BS, the receiver receives a Radio Resource Control reconfiguration message from the UE, the transmitter transmits a path switch request message including the second CSG ID to a Mobility Management Entity (MME), and wherein if a path switch request acknowledgement message is received by the receiver from the MME, the transmitter transmits a UL context release message to the source a BS.

In accordance with another aspect of the present invention, a Mobility Management Entity (MME) method for handover of a User Entity (UE) is provided. The MME method includes receiving a path switch request message from a target BS, the path switch request message including CSG information of the target BS, if the CSG information indicates that the target BS is a CSG BS supporting a specific CSG, transmitting a bearer update request message including user CSG information to a user plane entity, wherein, if the a bearer update response message is received, transmitting a path switch request acknowledgement message to the target BS, and wherein the CSG information of the target BS or CSG information broadcast from the target cell includes an access mode indicating that the target BS is CSG BS supporting a specific CSG or hybrid BS supporting the specific CSG and UEs not included the specific CSG, wherein if the target BS is the CSG BS or the hybrid BS, the CSG information includes a CSG ID of the specific CSG, and wherein if the target BS supports the same CSG supported by the source BS, the CSG information includes an identifier indicating that the target BS supports the same CSG.

Adopting the technical scheme of the present invention, when the preset condition is satisfied, for instance, the UE moves in a same CSG, or the UE moves into an open cell, or the UE moves into a hybrid cell, the X2 handover is adopted. Compared with S1 handover, the X2 handover procedure requires fewer steps for performing the signaling interaction with the MME. Thus, the processing burden of the core network is reduced, and the handover efficiency is improved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
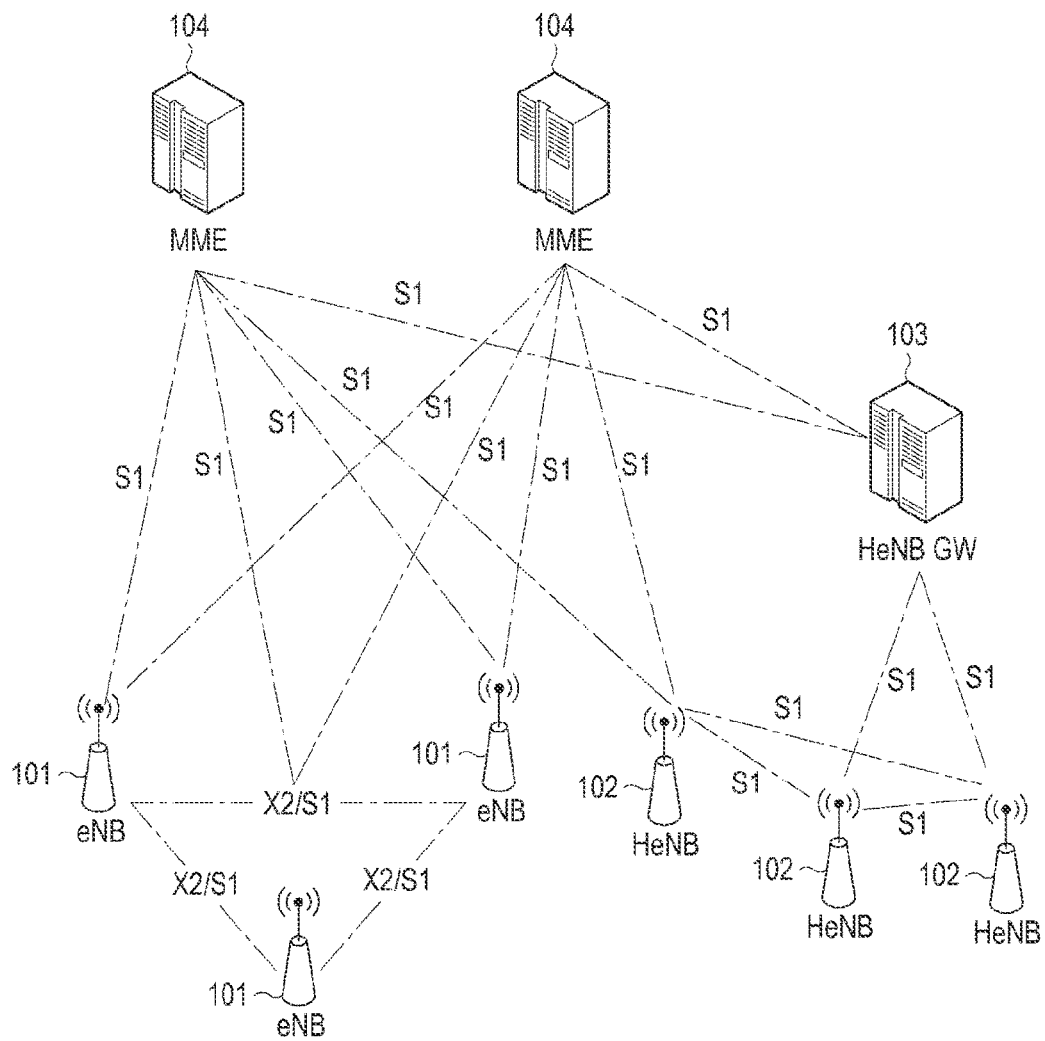
FIG. 1 is a schematic diagram illustrating a structure of a Long Term Evolution (LTE) system according to the related art.
Figure 2:
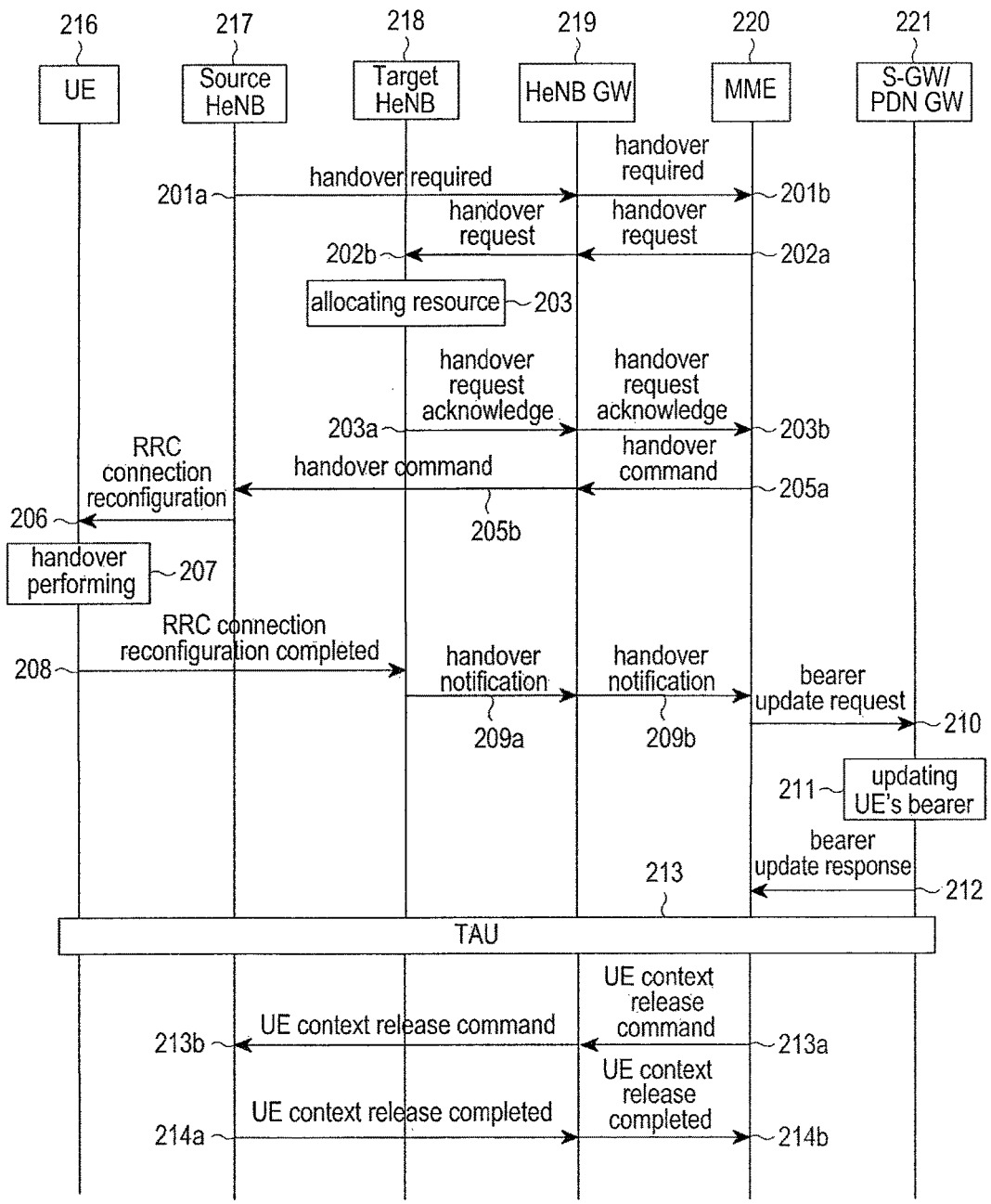
FIG. 2 is a schematic diagram illustrating the conventional S1 handover according to the related art.
Figure 3A:
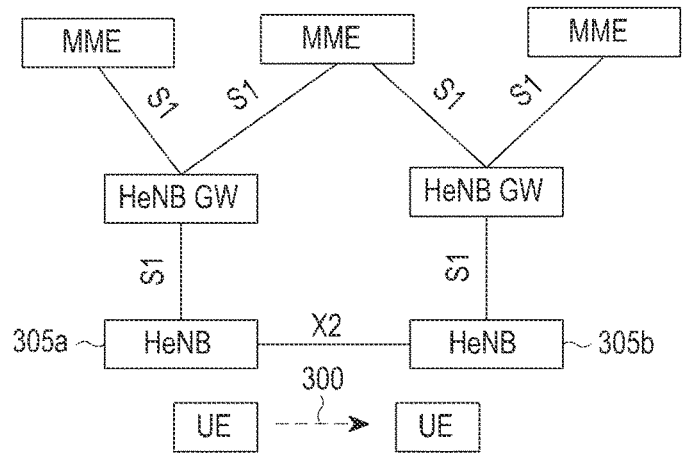
FIGS. 3A-3C are schematic diagrams illustrating each kind of connection structure when applying X2 handover to a Home evolved Node B (HeNB) according to the related art.
Figure 3B:
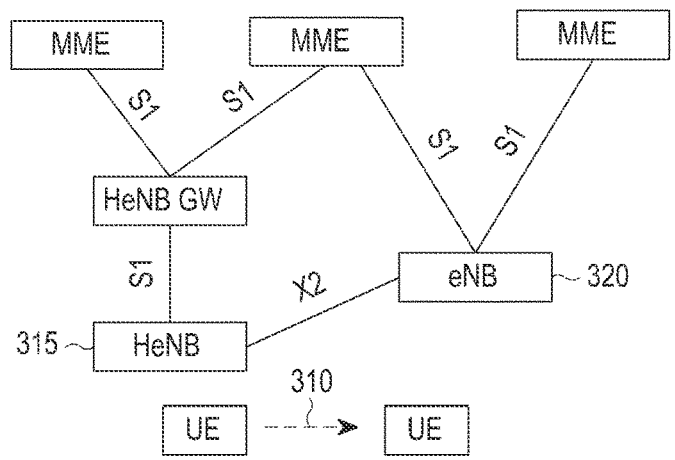
Figure 3C:
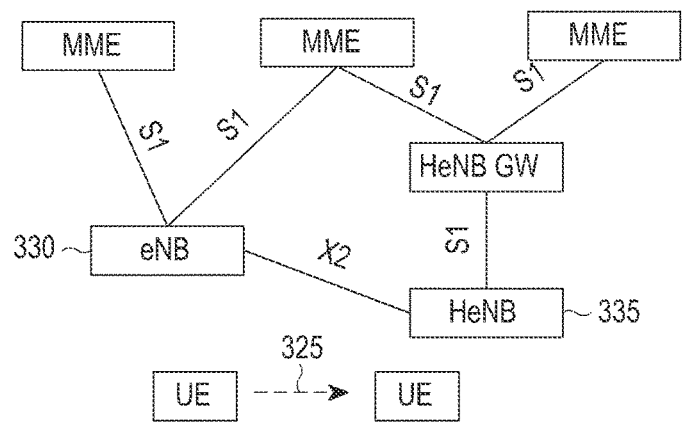

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiment of the present invention provide a handover scheme using X2 interface for reducing processing burden of the core network in the mobile communication system. When the User Entity (UE) moves in the same Closed Subscriber Group (CSG), or the UE moves into an open cell (may be a cell covered by a HeNB, or a cell covered by an eNB), or moves into a hybrid cell, X2 handover is adopted. Since fewer steps for interacting with a Mobile Management Entity (MME) are needed in the X2 handover process, the processing burden of the core network is reduced, and the handover efficiency is improved according to first and second exemplary embodiments of the present invention. Under a few circumstances, such as when the UE moves from one CSG to another CSG, S1 handover may still be adopted.

According to a third exemplary embodiment of the present invention, when a UE connects to a network through an HeNB, an MME or an HeNB GW sends the MME identifier of the UE's MME to the HeNB. When performing the X2 handover, the HeNB may send the MME identifier to the target eNB/HeNB to which the UE should handover, to enable the target eNB/HeNB to successfully send a path switch request message to the MME serving the UE. When the target HeNB accesses the MME through HeNB GateWay (GW), the target HeNB sends the MME identifier to the destination HeNB GW, to enable the destination HeNB GW to successfully send the path switch request message to the MME serving the UE, and to reduce frequent interactions with a Core Network (CN) during an S1 handover process when ensuring a successful X2 handover. Thus, influence of the handover process on the CN is reduced, and handover delay is reduced.

Figure 4:
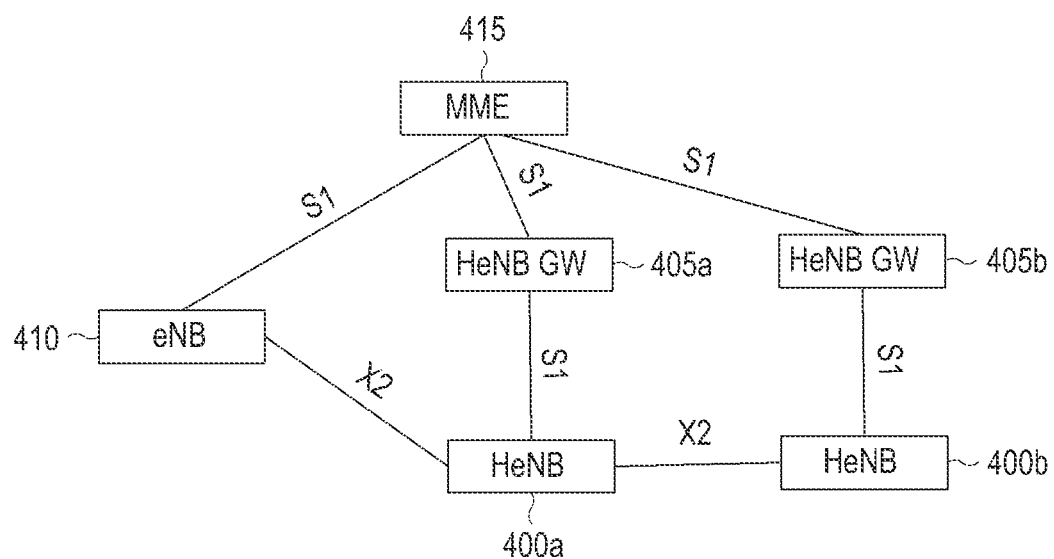
FIG. 4 is a schematic diagram illustrating a connection structure when performing X2 handover through an HeNB in accordance with an exemplary embodiment of the present invention.

The scheme of an exemplary embodiment of the present invention may be implemented on the basis of the network structure illustrated in FIG. 4.

FIG. 4 is a schematic diagram illustrating a connection structure when performing X2 handover through an HeNB in accordance with an exemplary embodiment of the present invention.

Referring to FIG. 4, both of the HeNB 400a and the HeNB 400b and the eNB 410 connect with the MME 415 in the core network through the S1 interfaces and adopt an S1 protocol stack. Each HeNB 400a and 400b also connects with the HeNB GWs 405a and 405b through the S1 interface and adopts the S1 protocol stack. Each HeNB 405a and 405b connect with another HeNB, and each HeNB 405a and 405b connects with an eNB 410 through an X2 interface and adopts an X2 protocol stack. Depending on the arrangement of the operator, the HeNB GWs 405a and 405b may, or may not exist. If the HeNB GW does not exist, the HeNB directly connects with the MME 415 through the S1 interface.

The first exemplary embodiment of the present invention may apply to the following situations involving X2 handover, including when the UE moves between HeNBs, when the UE moves between the HeNB and eNB, and when the UE moves between eNBs. X2 handover is performed in these situations. In addition, the scheme of an exemplary embodiment of the present invention may also apply to the scheme in which the UE moves among different Base Stations (BSs), HeNBs, eNBs, and between the HeNB in the 3$^{rd}$ Generation (3G) network.

Figure 5A:
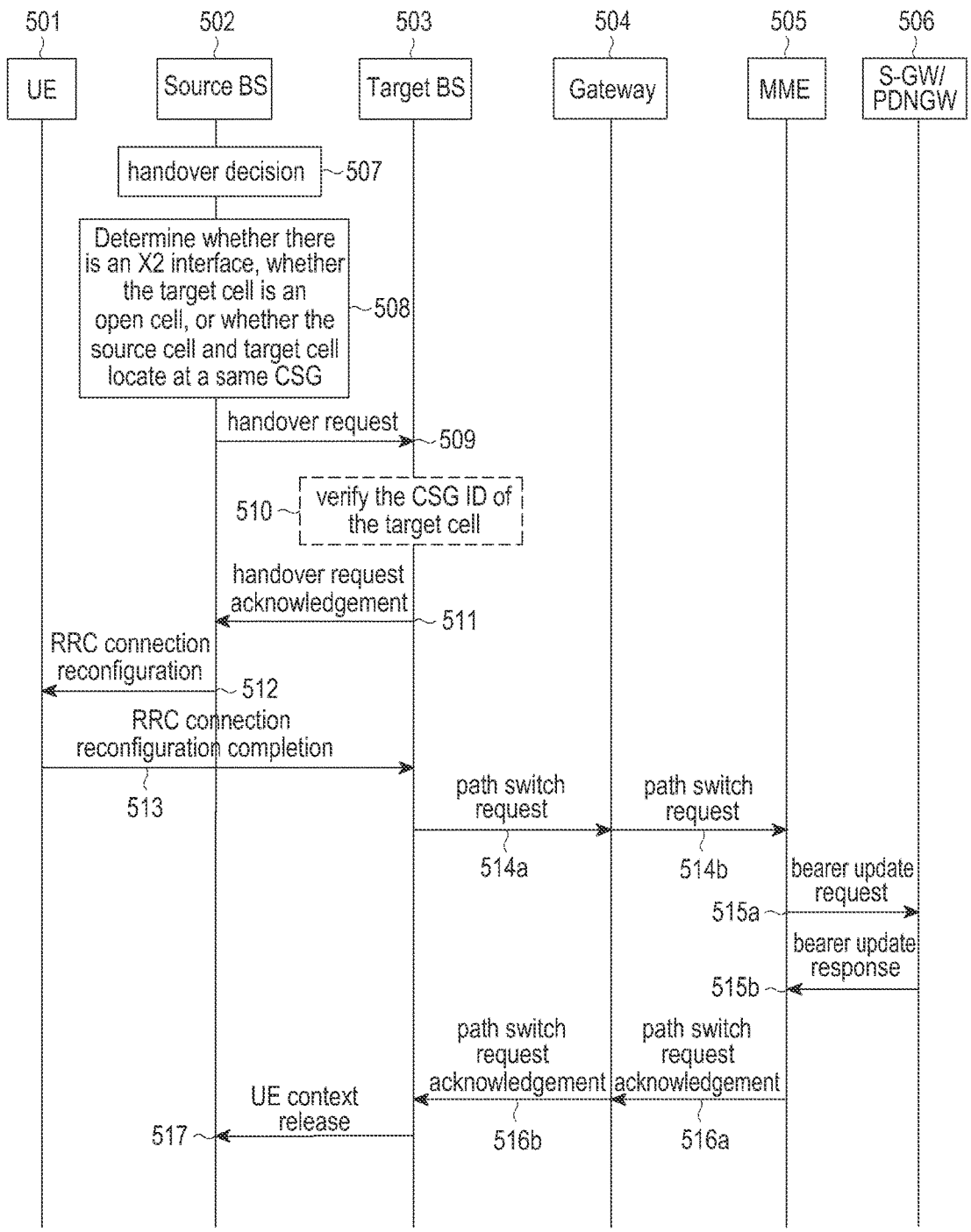
FIG. 5A is a flowchart illustrating a X2 handover method according to a first exemplary embodiment of the present invention.

FIG. 5A is a flowchart illustrating an X2 handover method according to a first exemplary embodiment of the present invention. As shown in FIG. 5A, the following steps are included. The UE moves among different BSs (a source BS and target BS), but the scheme of an exemplary embodiment of the present invention may also apply to the scheme in which the UE moves between apparatuses connected the X2 interface. The apparatuses include HeNBs and eNBs.

Referring to FIG. 5A, a source BS 502 makes a handover decision in step 507.

In step 508, the source BS 502 determines that an X2 handover procedure is adopted. For example, the source BS 502 determines whether there is an X2 interface between itself and the target BS 503. If there is not an X2 interface, the S1 handover flow of the related art is executed; otherwise, the source BS 502 further determines whether the target cell is an open cell, or whether the source cell and the target cell belong to a same CSG. If so, the X2 handover is performed, i.e., step 509 is performed.

The S1 handover flow is described above. In addition, the source cell and the target cell being located at a same CSG indicates that both the source cell and the target cell are CSG cells, and that they have the same CSG identifier.

The source BS 502 may be a HeNB or an eNB. The target BS 503 may also be the HeNB or eNB. According to different network configurations, there may or may not be an X2 interface between the source BS 502 and the target BS 503.

In addition, in step 508, the source BS 502 may obtain the CSG IDentifier (ID) and an access mode of the target cell from the UE 501, through the X2 setup procedure, according to the configuration of the operator, and/or through other fashions. The access mode refers to the type of the target cell, for instance, the hybrid or CSG cell. If the CSG ID does not exist, the target cell is considered as an open cell, or the target cell may be explicitly denoted as the open cell. Whether the source cell and the target belong to a same CSG can be determined according to the CSG ID of the target cell.

The method for obtaining the CSG ID and access mode of the target cell from the UE 501 includes obtaining the CSG ID and access mode from an Automatic Neighbor Relation (ANR), or from a measurement report sent for the purpose of handover. The specific implementations are well known, and any specific implementation may be employed. In addition, when initially accessing the network, the BS and partial other BSs may execute the X2 interface setup procedure. The BSs, with which the BS executes the X2 interface setup procedure, are determined according to the configuration of the operator and so on. The source BS 502 may obtain the CSG ID and access mode of the target cell with this method.

Figure 5B:
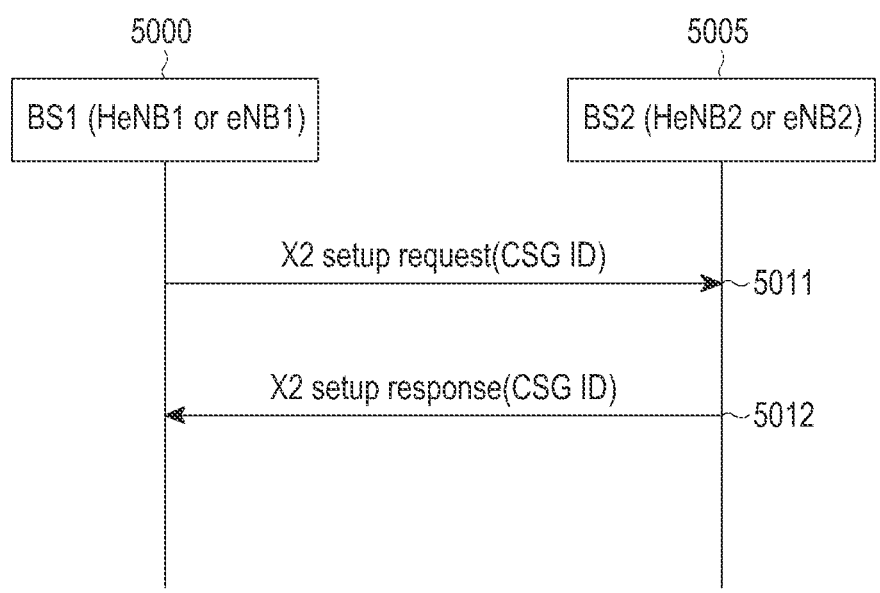
FIG. 5B is a schematic diagram illustrating a X2 interface setup procedure in accordance with a first exemplary embodiment of the present invention.

FIG. 5B is a schematic diagram illustrating an X2 interface setup procedure in accordance with a first exemplary embodiment of the present invention.

Referring to FIG. 5B, the BS1 5000 sends an X2 setup request message to the BS2 5005 in step 5011. The X2 setup request message includes information of serving cells belonging to BS1 5000. The information includes the CSG ID and Physical Cell Identifier (PCI) of each of the serving cells, and may further include the access mode of each the serving cells, etc. for indicating whether the cell is a hybrid cell or CSG cell. When the access mode of each of the serving cells is the hybrid cell, the X2 setup request message includes the access mode for indicating that the cell is the hybrid cell. When the cell is the CSG cell, the X2 setup request message does not include the access mode. This method is used for implicitly indicating that the access mode is the CSG type. Alternatively, the access mode is not carried in the X2 setup request message, but is determined according to the scope of the PCI of the cell.

In step 5012, the BS2 sends an X2 setup response message to the BS1. The X2 setup response message includes information of target cells belonging to the BS2 5005. The information includes the CSG ID and PCI of each of the target cells, and may further include an access mode of the each of the target cells, etc. for indicating whether the cell is a hybrid cell or a CSG cell. When the cell is the hybrid cell, the X2 setup response message includes the access mode for indicating that each of the target cells is the hybrid cell. When one of the target cells is the CSG cell, the X2 setup response message does not include the access mode.

This method is used for implicitly indicating that the access mode is the CSG type. If the access mode is not carried in the X2 setup response message, the access mode may be determined according to the scope of the PCI of the cell.

The BS1 5000 illustrated in FIG. 5B may be an eNB, or a HeNB. Similarly, the BS2 5005 may be an eNB or a HeNB. As shown in FIG. 5B, the source BS 502 obtains the CSG ID and the access mode of the target cell, and the source BS 502 determines X2 handover for the UE 501, and proceeds to step 509.

In step 509, the source BS 502 sends the handover request message to the target BS 503. If a target cell serviced by the target BS (503) is a CSG cell, the CSG ID of the target cell may be carried in the handover request message. In addition, if the CSG ID of the target is obtained through the X2 interface setup procedure as shown in FIG. 5B, the CSG ID of the target cell may not be carried. Since it is considered that the CSG ID of the target cell obtained through this mode is correct, it is unnecessary to perform the verification as shown in step 510.

In step 510, the target BS 503 verifies the CSG ID included in the handover request message of the target cell. The target BS 503 verifies whether the CSG ID of the target cell included in the handover request message is correct. The target BS 503 compares the CSG ID of the target cell included in the handover request message with the CSG ID broadcast by the target cell to determine whether the two CSG IDs are the same. If they are not the same, the X2 handover is rejected, and the CSG ID broadcast by the target cell, i.e. the correct CSG ID of the target cell is carried in a handover preparation failure message and sent to the source BS 502; otherwise, step 405 is performed.

Step 510 is optional. If the handover request message sent from the source BS 502 to the target BS 503 in step 509 does not include the CSG ID of the target cell, execution of step 510 is not needed.

In step 511, the target BS 503 sends a handover request acknowledgement message to the source BS 502.

In step 512, the source BS 502 sends a Radio Resource Control (RRC) connection re-configuration message to the UE 501.

In step 513, the UE 501 sends a RRC connection re-configuration completion message to the target BS 503.

In step 514a, the target BS 503 sends a path switch request message to the gateway. If the target cell is a CSG cell, the CSG ID of the target cell is carried in the path switch request message. If the target cell is a CSG cell, the target cell can determine that this handover adopts the X2 handover according to steps 509-514a, and the target cell knows the principle of X2 handover, i.e. under what circumstances X2 handover is adopted. Accordingly, the target cell may determine that both the source cell and target cell are CSG cells, and that they have the same CSG ID. Thus, the path switch request message may include the same CSG ID indication, indicating that the source cell and the target have the same CSG ID. In this situation, the CSG ID of the target may not be carried. In addition, if the source cell and target are HeNBs, the gateway is the HeNB GW.

In step 514b, the gateway 504 sends the path switch request message to the MME 505. The content of the path switch request message in this step are identical with the content of the path switch request message in step 514a. If the gateway 504 is not configured, steps 514a and 514b may be merged into one step, in which the target BS 503 sends the path switch request message to the MME 505.

In step 515a, the MME 505 sends a bearer update request message to a user plane entity, i.e. Service-Gateway/Packet Data Network Gateway (S-GW/PDN GW) 506. The signaling interactions between the S-GW and PDN GW are omitted here.

According to the received path switch request message, the MME 505 can determine that the target cell to which the UE 501 moves is a CSG cell or an open cell. For example, if the path switch request message includes the CSG ID of the target cell, it can be determined that the target cell of the UE 501 is the CSG cell. If the CSG ID of the target cell is not carried, it can be determined that the target cell is an open cell. If the received path switch request message includes the same CSG ID indication, it can be determined that the target cell and the source cell locate at a same CSG. In addition, the MME 505 knows the CSG ID and access mode of the source cell. Accordingly, the MME 505 can know the CSG ID and access mode of the target cell. If the PDN GW has requested the user CSG information of the UE (determined according to the UE context), under the circumstance that the target cell is the CSG cell, the bearer update request message sent from the MME 505 to the S-GW/PDN GW 506 includes the user CSG information.

The user CSG information includes the CSG ID of the target cell, the access mode of the target cell, and CSG membership indication of the target cell (the MME itself can make the judgment). The CSG membership indication indicates that the UE is joined to a CSG supported by the target cell, so that the PDN GW may charge the UE 501 according to the corresponding mode. In addition, if the PDN GW has requested the location information of the UE 501, the modify bearer request message sent from the MME 505 to the S-GW/PDN GW 506 further includes the location information of the UE 501, for example, the Evolved-Universal Terrestrial Radio Access Network (E-UTRAN) Cell Global Identifier (ECGI) and/or the Tracking Area Identity (TAI), etc. How the PDN GW requests the MME (505) for reporting the location information of the UE and/or the user CSG information is well known and is omitted herein for brevity.

In step 515b, the S-GW/PDN GW sends a bearer update response message to the MME.

In step 516a, the MME 505 sends a path switch request acknowledgement message to the gateway 504.

In step 516b, the gateway 504 sends the path switch request acknowledgement message to the target BS 503. If the gateway is not configured, steps 516a and 516b may be merged into one step, in which the MME 505 sends the path switch request acknowledgement message to the target BS 503.

In step 517, the target BS 503 sends a UE context release message to the source BS 502.

Figure 6:
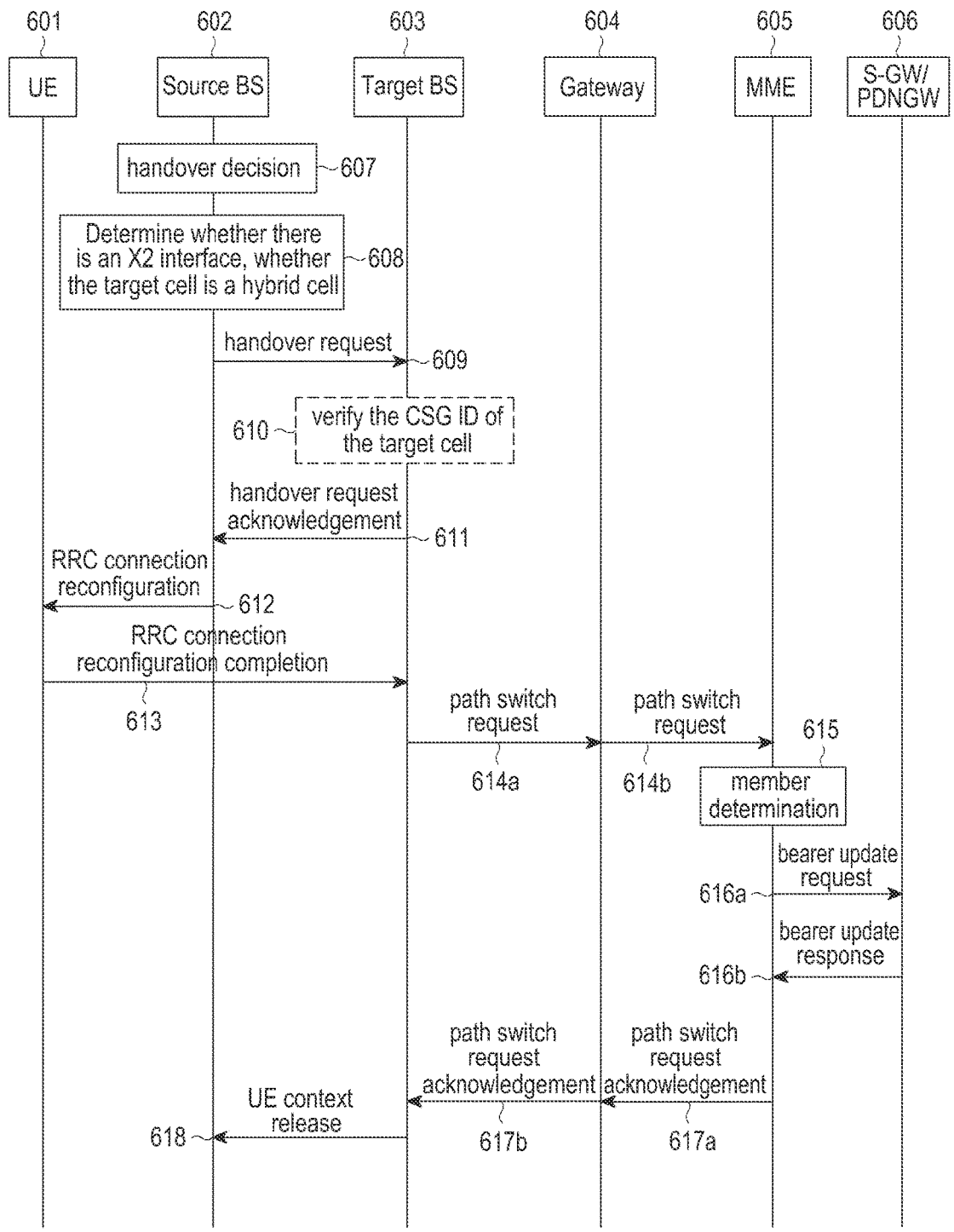
FIG. 6 is a flowchart illustrating an X2 handover method in accordance with a second exemplary embodiment of the present invention.

FIG. 6 is a flowchart illustrating a handover method according to a second exemplary embodiment of the present invention.

Referring to FIG. 6, a source BS 602 makes a handover decision in step 607.

In step 608, the source BS 602 determines that an X2 handover is adopted. For example, the source BS 602 determines whether there is an X2 interface between itself and the target BS 603. If there is not an X2 interface, the S1 handover process is executed; otherwise, the source BS 602 further determines whether the target cell is a hybrid cell. If yes, X2 handover is performed, i.e., step 609 is performed. Alternatively, the X2 handover may be adopted when the target cell is hybrid cell and the source cell and target cell have the same CSG ID. The S1 handover is adopted when they have different CSG IDs. The source BS 602 may be a HeNB or an eNB. The target BS (603) may also be the HeNB or eNB.

In addition, in step 608, the source BS 602 may obtain the CSG ID and an access mode of the target cell from the UE 601, through the X2 interface setup procedure, according to the configuration of the operator, and the like. The method for obtaining the CSG ID and the access mode is identical with that described above in step 402, and is unnecessary to be described again here.

In step 609, the source BS 602 sends the handover request message to the target BS. The handover request message may include the CSG ID of the target cell, and may further include a member indication for indicating whether the UE 601 is a subscribed or non-subscribed member of the target cell.

If the CSG ID of the target cell is obtained through the X2 interface setup procedure, the CSG identifier of the target cell may be omitted from the handover request message. In addition, the handover request message may include the member indication only under certain circumstances, such as when both the source cell and target cell are the hybrid cells, and have the same CSG ID.

In step 610, the target BS 603 verifies the received CSG ID of the target cell. The target BS 603 verifies whether the CSG ID of the target cell carried in the handover request message is correct. The target BS 603 compares the CSG ID of the target cell carried in the handover request message with the CSG ID broadcast by the target cell to determine whether the two CSG IDs are the same. If they are not the same, but the target cell is a hybrid cell, this handover is accepted, i.e. step 611 is executed. Under this circumstance, as an implementation mode, the UE 601 may first be processed as a non-signed member. If they are the same CSG ID, step 611 is performed.

If the handover request message does not include the CSG ID of the target cell, the verification does not need to be performed. In addition, if the source cell and the target cell are different hybrid cells, but have different CSG IDs, the target cell may first process the UE 601 as the non-subscribed member after receiving the handover request message sent from the source BS. For the subscribed member and non-subscribed member, the target BS may provide services of different Quality of Service (QoS).

In step 611, the target BS 603 sends a handover request acknowledgement message to the source BS 602.

If the verification in step 610 fails, the CSG ID broadcast by the target cell, i.e., the CSG ID of the correct target cell may be carried in the handover request acknowledgement message. Even if the CSG ID of the target cell received by the target BS 603 from the source BS (602) is not in accordance with the CSG ID broadcast by the target cell, this handover may also be accepted. Accordingly, the target BS 603 sends the correct CSG ID of the target cell to the source BS 602.

In step 612, the source BS 602 sends a RRC connection re-configuration message to the UE 601.

In step 613, the UE 601 sends a RRC connection re-configuration completion message to the target BS 603.

In step 614a, the target BS 603 sends a path switch request message to the gateway 604. The path switch request message includes the CSG ID and the access mode of the target cell, for indicating whether the target cell is a hybrid cell or a CSG cell. When the access mode is a CSG type, the path switch request message does not include the access mode, but only includes the CSG ID. This method is adopted for implicitly indicating that the target cell is a CSG cell. The target cell may be the hybrid type.

In addition, if the target cell receives member indication sent from the source BS 602, the target cell may determine that its CSG ID is identical with that of the source cell. Correspondingly, the target BS 603 may include the same CSG ID indication or member indication in the path switch request message. In this case, the CSG ID and access mode may or may not be carried in the path switch request message.

In step 614b, the gateway sends the path switch request message to the MME. The content of the path switch request message in this step is the same as that of the path switch request message in step 614a. If the gateway is not configured, steps 614a and 614b may be merged into one step, in which the target BS 603 sends the path switch request message to the MME 605.

In step 615, the MME 605 determines whether the UE (601) is a subscribed or non-subscribed member of the target cell. In step 615, the MME 605 determines whether the UE 601 is a subscribed or non-subscribed member only when the target cell is a hybrid cell. The determination may be made using any appropriate technique.

In step 616, the MME 605 sends a bearer update request message to an S-GW/PDN GW 606. The signaling interactions between the S-GW and PDN GW are omitted here.

According to the CSG ID and access mode of the target cell carried by the received path switch request message, the MME 605 knows the CSG ID and access mode of the target cell. In addition, if the path switch request message does not include the CSG ID and access mode, but includes the same CSG identifier indication, since the MME 605 knows the CSG ID and access mode of the source cell, the MME 605 knows the CSG ID and access mode of the target cell. If the path switch request message does not include the CSG ID, but does include the member indication, the MME 605 may acquiesce in that under this circumstance, the source cell and the target cell have the same CSG ID, and may also know the CSG ID and access mode of the target cell. In addition, the MME 605 has determined whether the UE (601) is a subscribed or non-subscribed member of the target cell in step 615. Accordingly, if the PDN GW has requested for the user CSG information determined from context of the UE 601, the MME includes the user CSG information in the bearer update request message sent to the S-GW/PDN GW 606.

The user CSG information includes the CSG ID of the target cell, access mode (i.e. hybrid cell), and CSG membership indication of the target cell, so that the PDN GW may charge the UE according to the corresponding mode. In addition, if the PDN GW has requested for the location information of the UE, the modify bearer request message sent from the MME 605 to the S-GW/PDN GW 606 further includes the location information of the user, for instance, the ECGI and/or the TAI, etc. How the PDN GW requests the MME 605 for reporting the location information of the UE 601 and/or the user CSG information may be implemented using any appropriate technique.

In step 616b, the S-GW/PDN GW sends a bearer update response to the MME 601.

In step 617a, the MME 601 sends a path switch request acknowledgement message to the gateway 604. The path switch request acknowledgement message may include the member indication indicating whether the UE 601 is a subscribed or non-subscribed member of the target cell. In addition, if the path switch request message received by the MME 605 in step 509 includes the member indication, and the result of whether the UE 601 is a subscribed member determined by the MME in step 615 is identical with the received member indication, the path switch request acknowledgement message in this step may not include the member indication; otherwise, the path switch request acknowledgement message includes the member indication.

The MME 605 may also notify the target BS 603 of the member indication through an S1 message, such as the UE context modification request message. Accordingly, the member indication does not need to be carried in the path switch request acknowledgement message in this step.

In step 617*b*, the gateway 604 sends the path switch request acknowledgement message to the target BS 603. The member indication may be carried in the path switch request acknowledgement message. If the gateway is not configured, steps 617*a* and 617*b* may be merged into one step, in which the MME 604 sends the path switch request acknowledgement message to the target BS 603.

In step 618, the target BS 603 sends a UE context release message to the source BS 602.

X2 handover in accordance with a third exemplary embodiment of the present invention is described below with respect to FIGS. 7 and 8.

Figure 7:
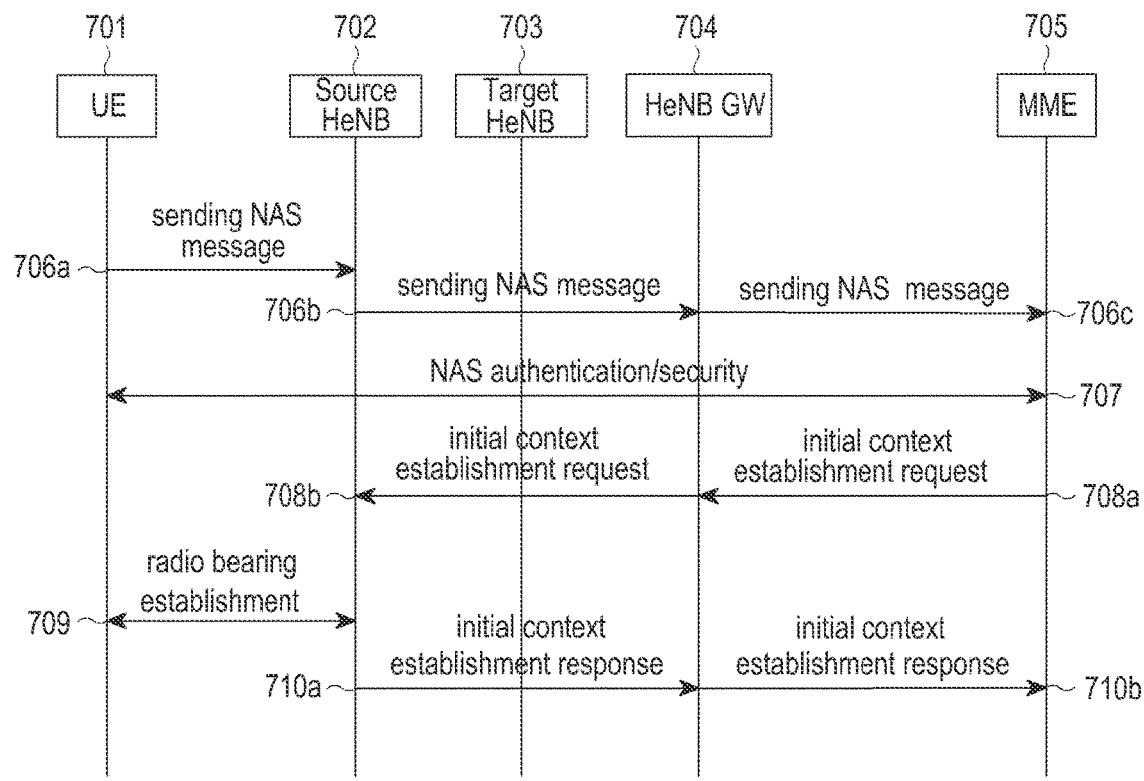
FIG. 7 is a working flow diagram of accessing a network by User Entity (UE) through an HeNB using network of FIG. 4 in accordance with an exemplary embodiment of the invention.

FIG. 7 is a working flow diagram of accessing a network by UE through an HeNB, when using the connection structure shown in FIG. 4 in accordance with an exemplary embodiment of the invention. Detailed descriptions about steps outside the scope of the present exemplary embodiment are omitted.

In step 706*a*, the UE 701 sends a Non-Access Stratum (NAS) message, e.g., an Attach message, a service request message, or the like, to a source HeNB 702. In steps 706*b* and 706*c*, the source HeNB 702 sends the NAS message received from the UE 701 to the HeNB GW 704 through S1 Access Protocol (AP) message, and the HeNB GW 704 sends the S1 AP message to the MME 705. If the source HeNB 702 requested to be accessed by the UE 701 is CSG-HeNB or hybrid-HeNB, the S1 AP message further includes CSG identifier of the source HeNB cell 704. In step 707, after receiving the NAS message, the MME 705 performs the NAS authentication/security process with the UE 701.

The performance of the NAS authentication/security process may be implemented using any appropriate implementation. When there is no UE context for the UE 701 in the network, when there is no integrity protection for the Attach request in steps 706*a* and 706*b*, or when the integrity authentication has failed, the integrity protection is activated with authentication and NAS security and the NAS encryption is performed. Otherwise, the process is optional. When the NAS security algorithm changes, the NAS security is established.

If the MME 705 supports unauthenticated International Mobile Subscriber Identification (IMSI) with emergent Attach, and the Attach type indicated by the UE 501 is emergent, the MME 705 will omit the authentication and security establishment process or the MME 705 will continue the Attach process when accepting the failed authentication.

In step 708*a* and 708*b*, the MME 705 sends an initial context setup request message to the HeNB GW 704, and the HeNB GW 704 sends the initial context setup request message to the source HeNB 702. The initial context setup request message includes the MME identifier of the MME 705 to service the UE 701. The MME identifier may be included in the initial context setup request message sent by the MME to the HeNB GW 704, may be included in the initial context setup request message sent by the HeNB GW 704 to the source HeNB 702, or the MME 705 identifier may be included only in the initial context setup request message sent by the HeNB GW 704 to the source HeNB 702. Any implementation may be employed.

In step 709, after receiving the initial context setup request message, the source HeNB 702 establishes the radio bearer with the UE 701.

In steps 710*a* and 710*b*, after establishing the radio bearer with the UE 701, the source HeNB 702 sends an initial context setup response message to the HeNB GW 704. The HeNB GW 704 sends the initial context setup response message to the MME 705.

Until now, the whole working flow for accessing a network by UE (701) through HeNB in accordance with an exemplary embodiment of the invention has been completed.

After establishing the radio bearer between the UE 701 and the source HeNB 702 in accordance with the present exemplary embodiment, the X2 handover may be performed through the HeNBs. An exemplary embodiment is described below with respect to FIG. 8.

Figure 8:
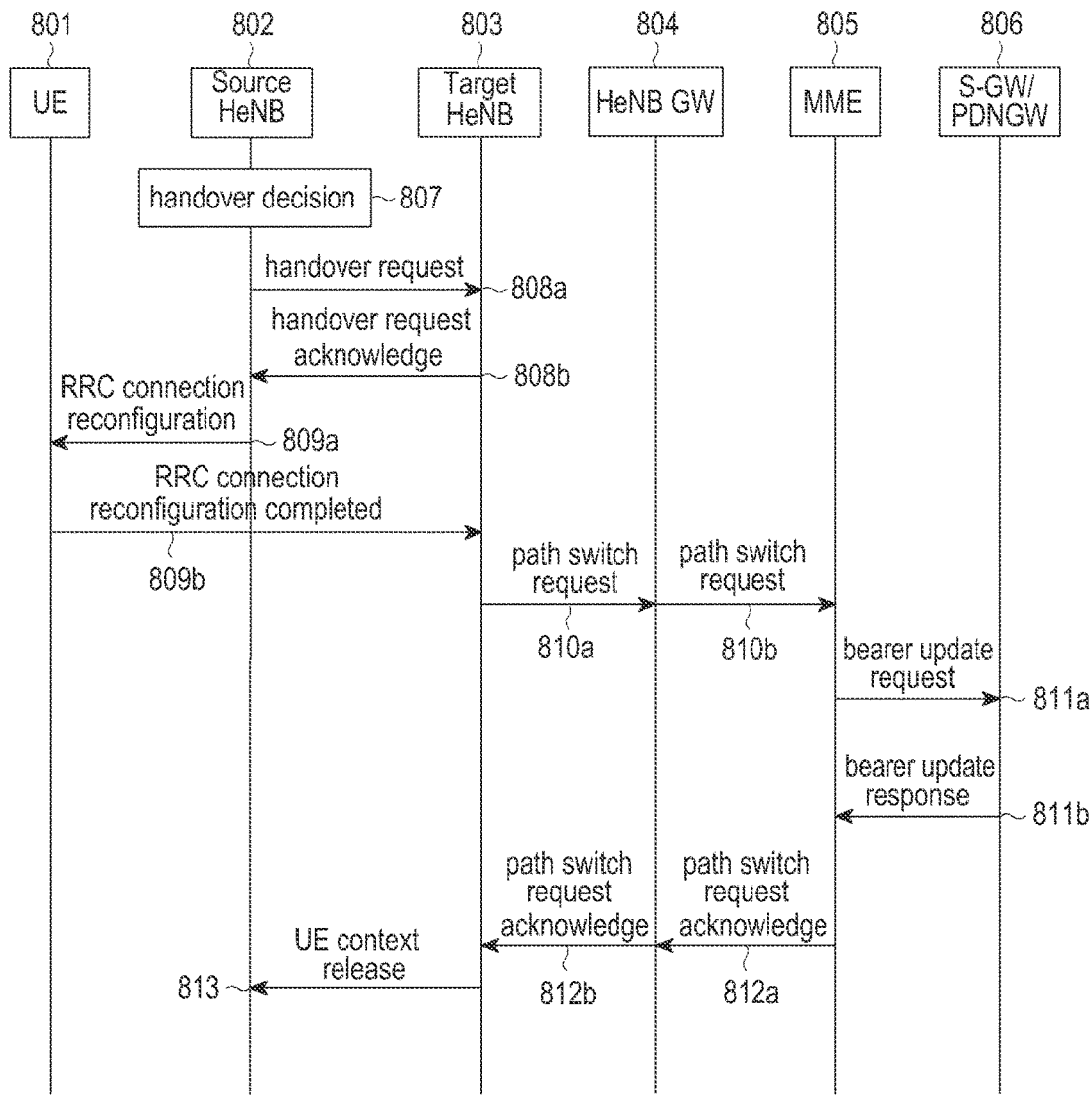
FIG. 8 is a working flow diagram of an X2 handover achieved with an HeNB in accordance with a third exemplary embodiment of the present invention.

FIG. 8 is a working flow diagram of X2 handover achieved with an HeNB in accordance with a third exemplary embodiment of the present invention. As shown in FIG. 8, detailed descriptions about steps outside the scope of the present exemplary embodiment are omitted.

In step 807, the source HeNB 802 makes a handover decision.

In step 808*a*, the source HeNB 802 sends a handover request message to a target HeNB 803. The handover request message includes an MME identifier of a MME 805 serving the UE 801.

In step 808*b*, the target HeNB 803 sends a handover request acknowledge message to the source HeNB 802.

In step 809*a*, the source HeNB 802 sends an RRC connection reconfiguration message to the UE 801, to request the UE 801 to X2 handover.

In step 809*b*, after handover, the UE 801 sends an RRC connection reconfiguration completion message to the target HeNB 803.

In step 810*a*, the target HeNB 803 sends a path switch request message to the HeNB GW 804, and the HeNB GW 804 sends the path switch request message to the MME 805. The path switch request message includes an MME identifier of the MME 805 serving the UE 801.

The path switch request message may further include a CSG identifier of the target HeNB 803. Furthermore, the path switch request message may further include access mode of the target HeNB 803, e.g. hybrid, etc. The value of the access mode may further include a CSG type, or the existence of CSG identifier may be used to implicitly demonstrate the CSG type of the target HeNB 803 when there is no access mode. When the target HeNB 803 accesses the MME 805 without going through the HeNB GW 804, the path switch request message is directly sent by the target HeNB 803 to the MME 805.

In step 811*a*, the MME 805 sends a bearer update request message to S-GW/PDN GW 806. The MME 805 may learn of the CSG identifier and the access mode of the destination cell, according to the CSG identifier and access mode information about the destination cell carried in received path switch request message. If the destination cell is hybrid, the MME 805 may determine whether the UE 801 is a subscribed member or a non-subscribed member of the destination cell according to the CSG identifier of the destination cell. Accordingly, if the PDN GW requests the user CSG information about the UE (which may be learned according to the UE context), the MME may includes the user CSG information in the bearer update request message which is sent to the S-GW/PDN GW 806. The user CSG information includes the CSG identifier and access mode of the destination cell, as well as whether the UE 801 is a subscribed member or a non-subscribed member of destination cell, so as to facilitate subsequent charging performed by the PDN GW for the UE 801 according to a corresponding mode. The requesting of the MME 805 to report the user CSG information by the PDN GW may be implemented using any known technique.

In step 811*b*, after modifying the UE 801's bearer, the S-GW/PDN GW 806 sends a modify bearer response message to the MME 805.

In steps 812*a* and 812*b*, the MME 805 sends a path switch request acknowledge message to the HeNB GW 805, and the HeNB GW 805 sends the path switch request acknowledge message to the target HeNB 803. When the target HeNB 803 accesses the MME 805 without going through the HeNB GW 804, the path switch request acknowledge message is directly sent by the MME 805 to the target HeNB 803.

In step 813, after receiving the path switch request acknowledge message, the target HeNB 803 sends a UE context release message to the source HeNB 802.

Until now, the whole working flow for performing the X2 handover through the HeNB in accordance with an exemplary embodiment of the invention is completed.

The exemplary embodiments illustrated with FIGS. 7 and 8 are only described in examples in which X2 handover is performed between HeNBs. In practical applications, the above handover process may also be applicable to the X2 handover process between an eNB and an HeNB accessed a CN through the HeNB GW. The specific process is as above, which will not be repeated here.

In the method for performing X2 handover through HeNB adopted by the third exemplary embodiment of the invention, when the UE accesses a network through the HeNB, the MME or the HeNB GW sends an MME identifier of an MME serving the UE to the HeNB. When performing the X2 handover, the HeNB may send the MME identifier to the target eNB/HeNB to which the UE needs to handover, to enable the target eNB/HeNB to successfully send the path switch request message to the MME serving the UE. When the target HeNB accesses the MME through the HeNB GW, the target HeNB sends the MME identifier to the destination HeNB GW, to enable the destination HeNB GW to successfully send the path switch request message to the MME serving the UE, and to reduce frequent interactions with the CN during an S1 handover process when ensuring a successful X2 handover. Thus, influence of the handover process on the CN is reduced, and handover delay is reduced.

The foregoing are only exemplary embodiments of the invention, which is not used for limiting the invention. Any modifications, equivalent substitutions, improvements, etc, within the spirit and principle of the invention, should be covered by the scope of the invention.

Figure 9:
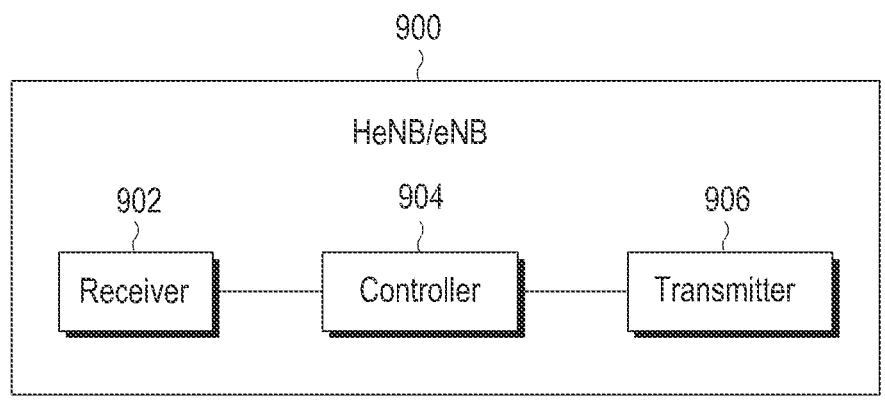
FIG. 9 is a block diagram illustrating a structure of an HeNB/eNB or Base Station (BS) according to an exemplary embodiment of the present invention.

FIG. 9 is a block diagram illustrating a structure of an HeNB/eNB or BS according to an exemplary embodiment of the present invention.

Referring to FIG. 9, each HeNB/eNB and BS operates as source HeNB/eNB and BS or target HeNB/eNB or BS, and a HeNB/eNB 900 includes a receiver 902, a controller 904, and a transmitter 906. The controller 904 determines handover of the UE using an X2 interface.

For example, when the HeNB/eNB 900 operates as a source HeNB/eNB or BS. according to the first and second embodiment of the present invention, the controller 904 determines handover of the UE using X2 interface. If there is an X2 interface between the source BS and the target BS, and if the target BS doesn't support a CSG or the target BS supports a same CSG supported by the source BS, the controller 904 determines to perform the handover of the UE using the X2 interface, and obtains the CSG information of the target BS through an X2 interface set up procedure.

The transmitter 906 transmits a handover request message comprising (CSG) information of the target BS to the target BS. The receiver 902 receives a handover request acknowledgement message from the target BS. The CSG information includes an access mode indicating that the target BS is CSG BS supporting a specific CSG or hybrid BS supporting the specific CSG and UEs not included the specific CSG. If the target BS is the CSG BS or the hybrid BS, the CSG information includes a CSG ID of the specific CSG. If the target BS supports the same CSG supported by the source BS, the CSG information includes an identifier indicating that the target BS supports the same CSG. If the target BS is the hybrid BS, a membership identifier indicating whether the UE is joined to a CSG supported the hybrid BS.

In the X2 interface set up procedure, the transmitter 906 transmits a X2 setup request message comprising a CSG (ID) and a PCI for each serving cell of the source BS to the target BS, and the receiver 902 receives a X2 setup response message from target BS comprising a CSG ID and a PCI for each serving cells of the target BS.

According to the third exemplary embodiment of the present invention, if a MME identifier of MME serving the UE from MME or BS gateway, the transmitter 906 transmits the handover request message further comprising the MME identifier to the target BS by controlling of the controller (904).

For example, when the HeNB/eNB or BS 900 operates as a target source HeNB/eNB or BS according to the first and second exemplary embodiments of the present invention, the receiver 902 receives a handover request message comprising CSG information of a target BS from a source BS.

If the CSG information includes a first CSG ID, the controller 904 determines whether the first CSG ID and a second CSG ID are the same, and obtains the second CSG ID from CSG information broadcasted from the target cell. If the first CSG ID and the second CSG ID are the same, the transmitter 906 transmits a handover request acknowledgement message to the source BS, and the receiver 902 receives a RRC re-configuration message from the UE. The transmitter 906 transmits a path switch request message including the second CSG ID to MME. If a path switch request acknowledgement message is received by the receiver 902 from the MME, the transmitter 906 transmits an UpLink UL context release message to the source a BS.

When the HeNB/eNB or BS 900 operates as a target source HeNB/eNB or BS according to the third exemplary embodiment of the present invention, if the controller 904 obtains a MME ID of a MME serving the UE from the handover request message, the transmitter 906 transmits a path switch request message comprising the MME ID to the MME corresponding to the MME ID by controlling of the controller.

Figure 10:
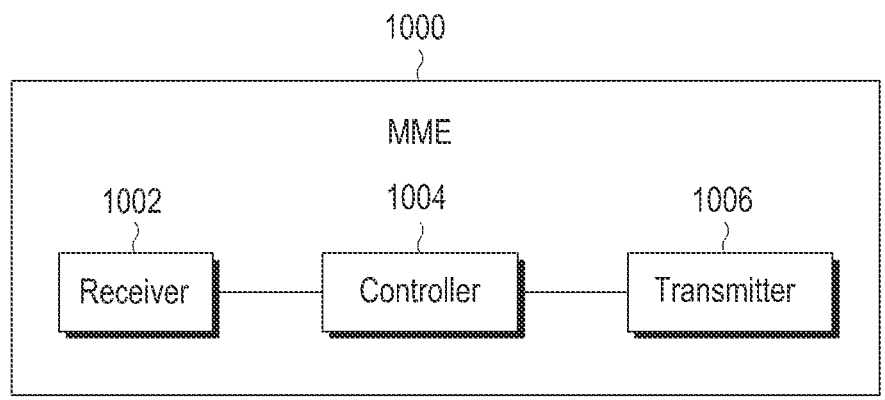
FIG. 10 is a block diagram illustrating a structure of a Mobile Management Entity (MME) according to an exemplary embodiment of the present invention.

FIG. 10 is a block diagram illustrating a structure of an MME according to an exemplary embodiment of the present invention.

Referring to FIG. 10, the MME 1000 includes a receiver 1002, controller 1004, and transmitter 1006.

The receiver 1002 receives a path switch request message comprising CSG information of a target BS from the target BS. If the CSG information indicates that the target BS is a CSG BS supporting a specific CSG, the transmitter 1006 transmits a bearer update request message including user CSG information to a user plane entity. If the receiver 1002 receives a bearer update response message, the transmitter 1006 transmits a path switch request acknowledgement message to the target BS by controlling of the controller (1004). The CSG information of the target BS or CSG information broadcast from the target cell includes an access mode indicating that the target BS is CSG BS supporting a specific CSG or hybrid BS supporting the specific CSG and UEs not included the specific CSG. If the target BS is the CSG BS or the hybrid BS, the CSG information includes a CSG ID of the specific CSG, and if the target BS supports the same CSG supported by the source BS, the CSG information includes an identifier represents that the target BS supports the same CSG.

According to an exemplary embodiment of the present invention, the processing burden of the core network can be reduced, and handover efficiency is improved.

The foregoing are only exemplary embodiments of the present invention. The protection scope of the present invention, however, is not limited to the above description. Any change or substitution, easily occurring to those skilled in the art, should be covered by the protection scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a handover of a user entity (UE) by a source evolved node B (eNB), the method comprising:
    communicating, by the source eNB, with the UE subscribed to a closed subscriber group (CSG) served by the source eNB;
    determining, by the source eNB, whether an X2-based handover of the UE is to be performed if no access control at a mobility management entity (MME) is required; and
    if the X2-based handover of the UE is determined to be performed, transmitting, to a target eNB, a handover request message including CSG membership status indicating whether the UE is a subscribed or non-subscribed member of a CSG served by the target eNB,
    wherein no access control at the MME is required if the target eNB is a hybrid eNB and a CSG identifier (ID) of the target eNB is identical to a CSG ID of the source eNB.

2. The method of claim 1, further comprising:
    if a handover request acknowledge message in response to the handover request message is received from the target eNB, transmitting, to the UE, a radio resource control (RRC) connection re-configuration message.

3. The method of claim 1,
    wherein the determining of whether the X2-based handover is to be performed comprises:
        performing an X2 interface set up procedure for the UE with the target eNB,
    wherein the X2 setup procedure comprises:
        transmitting, to the target eNB, an X2 setup request message including the CSG ID of the source eNB and a physical cell identifier (PCI) for respective cells served by the source eNB, and
        receiving, from the target eNB, an X2 setup response message including the CSG ID of the target eNB and a PCI for respective cells served by the target eNB in response to the X2 setup request message.

4. The method of claim 1, wherein the handover request message further includes serving MME identification information of the UE.

5. A method for a handover of a user entity (UE) by a target evolved node B (eNB), the method comprising:
    if an X2-based handover between a source eNB and the target eNB is determined to be performed, receiving, from the source eNB, a handover request message comprising closed subscriber group (CSG) membership status indicating whether the UE is a subscribed or non-subscribed member of a CSG served by the target eNB,
    wherein the X2-based handover between the source eNB and the target eNB is determined to be performed if no access control at a mobility management entity (MME) is required, and
    wherein no access control at the MME is required if the target eNB is a hybrid eNB and a CSG identifier (ID) of the target eNB is identical to a CSG ID of the source eNB.

6. The method of claim 5, further comprising:
    performing an X2 interface set up procedure for the UE with the source eNB, wherein the X2 based handover is determined to be performed based on information obtained through the X2 interface set up procedure,
    wherein the X2 setup procedure comprises:
        receiving, from the source eNB, an X2 setup request message including the CSG ID of the source eNB and a physical cell identifier (PCI) for respective cells served by the source eNB, and
        transmitting, to the source eNB, an X2 setup response message including the CSG ID of the target eNB and a PCI for respective cells served by the target eNB in response to the X2 setup request message.

7. The method of claim 5, further comprising:
    transmitting a handover request acknowledge message in response to the handover request message to the source eNB;
    receiving, from the UE, a radio resource control (RRC) connection re-configuration completion message indicating procedure completion for the X2-based handover of the UE;
    transmitting a path switch request message including the CSG ID of the target eNB to the MME; and
    if a path switch request acknowledgment (ACK) message in response to the path switch request message is received from the MME, deleting a corresponding bearer context,
    wherein the handover request message further includes serving MME identification information of the UE, and
    wherein the path switch request message further includes an access mode indicating that the target eNB is the hybrid eNB.

8. A method for a handover of a user entity (UE) by a mobility management entity (MME), the method comprising:
    receiving, from a target evolved node B (eNB), a path switch request message informing that the UE has changed from a cell of a source eNB to a cell of the target eNB in an X2-based handover of the UE, wherein the UE is subscribed to a closed subscriber group (CSG) served by the source eNB;
    determining a CSG membership state indicating whether the UE is a subscribed or non-subscribed member of a CSG served by the target eNB based on CSG information included in the path switch request message;

transmitting a modify bearer request message including the CSG information to a serving gateway (S-GW); and if a modify bearer response message is received from the S-GW, transmitting a path switch request acknowledgment (ACK) message to the target eNB, wherein the X2-based handover between the source eNB and the target eNB is determined to be performed if no access control at the MME is required, and wherein no access control at the MME is required if the target eNB is a hybrid eNB and a CSG identifier (ID) of the target eNB is identical to a CSG ID of the source eNB.

9. The method of claim 8, wherein the CSG information includes the CSG ID of the target eNB and an access mode indicating that the target eNB is the hybrid eNB.

10. A source evolved Node B (eNB) for a handover of user entity (UE), the source eNB comprising:

a transceiver configured to communicate with the UE subscribed to a closed subscriber group (CSG) served by the source eNB; and a controller configured to:
determine whether an X2-based handover of the UE is to be performed if no access control at a mobility management entity (MME) is required, and if the X2-based handover of the UE is determined to be performed, control the transceiver to transmit, to a target eNB, a handover request message including CSG membership status indicating whether the UE is a subscribed or non-subscribed member of a CSG served by the target eNB, wherein no access control at the MME is required if the target eNB is a hybrid eNB and a CSG identifier (ID) of the target eNB is identical to a CSG ID of the source eNB.

11. The source eNB of claim 10, wherein the transceiver is further configured to, if a handover request acknowledge message in response to the handover request message is received from the target eNB, transmit, to the UE, a radio resource control (RRC) connection re-configuration message.

12. The source eNB of claim 10,
wherein the controller is further configured to:
perform an X2 interface set up procedure for the UE with the target eNB, and
wherein the X2 interface set up procedure comprises:
transmitting an X2 setup request message including the CSG ID of the source eNB and a physical cell identifier (PCI) for respective cells served by the source eNB, and
receiving, from the target eNB, an X2 setup response message including the CSG ID of the target eNB and a PCI for respective cells served by the target eNB in response to the X2 setup request message.

13. The source eNB of claim 10, wherein the handover request message further includes serving MME identification information of the UE.

14. A target evolved node B (eNB) for a handover of a user entity (UE), the target eNB comprising:

a transceiver configured to receive, from a source eNB, a handover request message comprising a closed subscriber group (CSG) membership status indicating whether the UE is a subscribed or non-subscribed member of a CSG served by the target eNB if an X2-based handover between the source eNB and the target eNB is determined to be performed, the source eNB communicating with the UE subscribed to a CSG served by the source eNB, wherein the X2-based handover between the source eNB and the target eNB is determined to be performed if no access control at a mobility management entity (MME) is required, and wherein no access control at the MME is required if the target eNB is a hybrid eNB and a CSG identifier (ID) of the target eNB is identical to a CSG ID of the source eNB.

15. The target eNB of claim 14, further comprising:
a controller configured to perform a X2 interface set up procedure for the UE with the source eNB,
wherein the X2 based handover is determined to be performed based on information obtained through the X2 interface set up procedure, and
wherein the X2 interface setup procedure comprises:
receiving, from the source eNB, an X2 setup request message including the CSG ID of the source eNB and a physical cell identifier (PCI) for respective cells served by the source eNB, and
transmitting, to the source eNB, an X2 setup response message including the CSG ID of the target eNB and a PCI for respective cells served with the target eNB in response to the X2 setup request message.

16. The target eNB of claim 14, wherein the transceiver is further configured to:
transmit a handover request acknowledge message in response to the handover request message to the source eNB, and
transmit, if a radio resource control (RRC) connection re-configuration completion message indicating procedure completion for the handover of the UE is received, a path switch request message including the CSG ID of the target eNB to an MME based on controlling of the controller,
wherein the controller is further configured to delete a corresponding bearer context if the receiver receives a path switch request acknowledgment (ACK) message in response to the path switch request message, from the MME,
wherein the handover request message further includes serving MME identification information of the UE, and
wherein the path switch request message further includes an access mode indicating that the target eNB is the hybrid eNB.

17. A mobility management entity (MME) for a handover of a user entity (UE), the MME comprising:
a transceiver configured to receive, from a target evolved node B (eNB), a path switch request message informing that the UE has changed from a cell of a source eNB to a cell of the target eNB in an X2-based handover of the UE, wherein the UE is subscribed to a closed subscriber group (CSG) served by the source eNB; and
a controller configured to:
determine a CSG membership state indicating whether the UE is a subscribed or non-subscribed member of a CSG of the target eNB based on CSG information included in the path switch request message, and
control the transceiver to transmit a modify bearer request message including the CSG information to a serving gateway (S-GW), and transmit, if a modify bearer response message is received from the S-GW, a path switch request ACK message to the target eNB,
wherein the X2-based handover between the source eNB and the target eNB is determined to be performed if no access control at the MME is required, and wherein no access control at the MME is required if the target eNB is a hybrid eNB and a CSG identifier (ID) of the target eNB is identical to a CSG ID of the source eNB.

18. The MME of claim 17, wherein the CSG information further includes an access mode indicating that the target eNB is the hybrid eNB.

\* \* \* \* \*